(12) United States Patent
Huang et al.

(10) Patent No.: US 6,494,586 B1
(45) Date of Patent: Dec. 17, 2002

(54) BACK-LIGHT MODULE WITH IMPROVED LIGHT PROJECTING ASSEMBLY FOR IMAGE SCANNING DEVICE

(75) Inventors: Yin-Chun Huang, Hsinchu (TW); Chih-Wen Huang, Hsinchu (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/900,895

(22) Filed: Jul. 10, 2001

(51) Int. Cl.[7] .............................................. G01D 11/28
(52) U.S. Cl. .............................. 362/27; 362/26; 362/31; 349/63; 349/65; 358/509; 358/474; 358/475
(58) Field of Search .............................. 362/26, 31, 27; 349/63, 65; 358/509, 474, 475

(56) References Cited

U.S. PATENT DOCUMENTS

| | | | | |
|---|---|---|---|---|
| 4,729,067 A | * | 3/1988 | Ohe | 362/26 |
| 5,038,227 A | * | 8/1991 | Koshiyouji et al. | 358/471 |
| 5,781,311 A | * | 7/1998 | Inoue et al. | 358/475 |
| 6,185,011 B1 | * | 2/2001 | William | 358/474 |
| 6,339,418 B1 | * | 1/2002 | Kitagawa | 345/102 |

* cited by examiner

Primary Examiner—Thomas M. Sember
Assistant Examiner—Jacob Y. Choi
(74) Attorney, Agent, or Firm—Rosenberg, Klein & Lee

(57) ABSTRACT

A back-light module with an improved light projecting assembly for an image scanning device is disclosed. The light projecting assembly includes a light projecting window having two symmetric or asymmetric opposite edges, incorporated with the back-light module. A light guide plate is mounted in the back-light module with a shape corresponding to that of the light projecting window. Two tubular lamps with a shape corresponding to the edges of the light guide plate. Light transmitted from the tubular lamps are guided by the light guide plate for spreading over and projecting from the light guide plate onto a diffusion plate arranged under the light guide plate. The light is further distributed by a diffusion plate and projected to the optical scanning module of the scanner via the light projecting window.

6 Claims, 8 Drawing Sheets

BACK-LIGHT MODULE WITH IMPROVED LIGHT PROJECTING ASSEMBLY FOR IMAGE SCANNING DEVICE

BACKGROUND OF THE INVENTION

1. Field of the Invention

The present invention generally relates to a back-light module for image scanning devices, and in particular to a back-light module with an improved light projecting assembly for projecting a uniform light to the image scanning devices.

2. Description of the Prior Art

Document scanners are generally classified in two types for respectively handling a reflective original document which comprises an opaque substrate and a transmissive original document which comprises a transparent substrate. A transmissive original document scanner comprises a back-light module for generating light projecting the image formed on an original document onto an image sensor system of the document scanner.

A conventional back-light module comprises a movable line-type light source which is movable in a given direction from one end of the original document to an opposite end. A driving system is required to move the light source, which complicates the overall structure of the back-light module.

Another conventional back-light module comprises a surface-type light source which requires no movement of any parts of the back-light module. FIG. 1 is a perspective view that shows an image scanning device 1 equipped with a back-light module 2 comprising a surface-type light source.

As shown in FIG. 1, the conventional scanner 1 for transmissive original documents comprises a housing (not labeled) having a transparent document supporting plate 10 thereon for supporting an original document to be scanned (not shown). A back-light module 3 is pivotally mounted on the scanner 1 for selectively covering the document supporting plate 10. An optical scanning module 11, comprising a sensor system, is movably supported inside the housing of the scanner by a pair of guide rails 12, 13 for scanning the original document supported on the transparent document supporting plate 10. At scanning of a transparent original document, the back-light module 2 is covered on the document supporting plate 10.

The back-light module 2 includes a casing 21 having an open bottom closed by a bottom plate 22. Within the inner space formed by the casing 21 and the bottom plate 22, there are two tubular lamps, a reflective sheet, a light guide plate, and a diffusion plate. Commonly, the tubular lamps are arranged parallelly along two opposite sides of the light guide plate. Light transmitted from the tubular lamps are guided by the light guide plate for spreading over and projecting from the light guide plate onto the diffusion plate. The light is further distributed by the diffusion plate to uniformly project toward and through the light projecting window 23 to the optical scanning module 11.

The light projecting window 23 mounted on the bottom plate 22 of the back-light module 2 is a light transmissible window. Conventionally, various geometrical patterns of light projecting window are designed according to different requirements, such as rectangular shape light projecting window 23 as shown in FIG. 1 or long rectangular light projecting window 24 as shown in FIG. 2. In scanning operation, a mask with an identical window corresponding to the shape of the original transparent document to be scanned is needed to be placed on the document supporting plate. Therefore, user must prepare a number of masks with different shapes, which is very inconvenient in practice.

Thus, it is desired to provide an improved light projecting assembly for the back-light module for overcoming the above discussed problems.

SUMMARY OF THE INVENTION

Accordingly, the primary object of the present invention is to provide an improved light projecting assembly of a back-light module for providing various illumination requirements at scanning different transmissive original documents.

Another object of the present invention is to provide a light projecting assembly for providing a uniform projecting light to the optical scanning module of a scanner. The light projecting assembly is provided with a light projecting window having two symmetric or asymmetric opposite edges.

To achieve the objects above, the back-light module in accordance with a preferred embodiment of the present invention is provided with a light projecting window having two symmetric or asymmetric opposite edges, incorporated with the back-light module. A light guide plate is mounted in the back-light module with a shape corresponding to that of the light projecting window. Two tubular lamps with a shape corresponding to the edges of the light guide plate. Light transmitted from the tubular lamps are guided by the light guide plate for spreading over and projecting from the light guide plate onto a diffusion plate arranged under the light guide plate. The light is further distributed by a diffusion plate and projected to the optical scanning module of the scanner via the light projecting window.

The present invention will be apparent to those skilled in the art by reading the following description of a preferred embodiment and the best mode of operation thereof with reference to the attached drawings, in which:

DETAILED DESCRIPTION OF THE PREFERRED EMBODIMENTS

Figure 1:
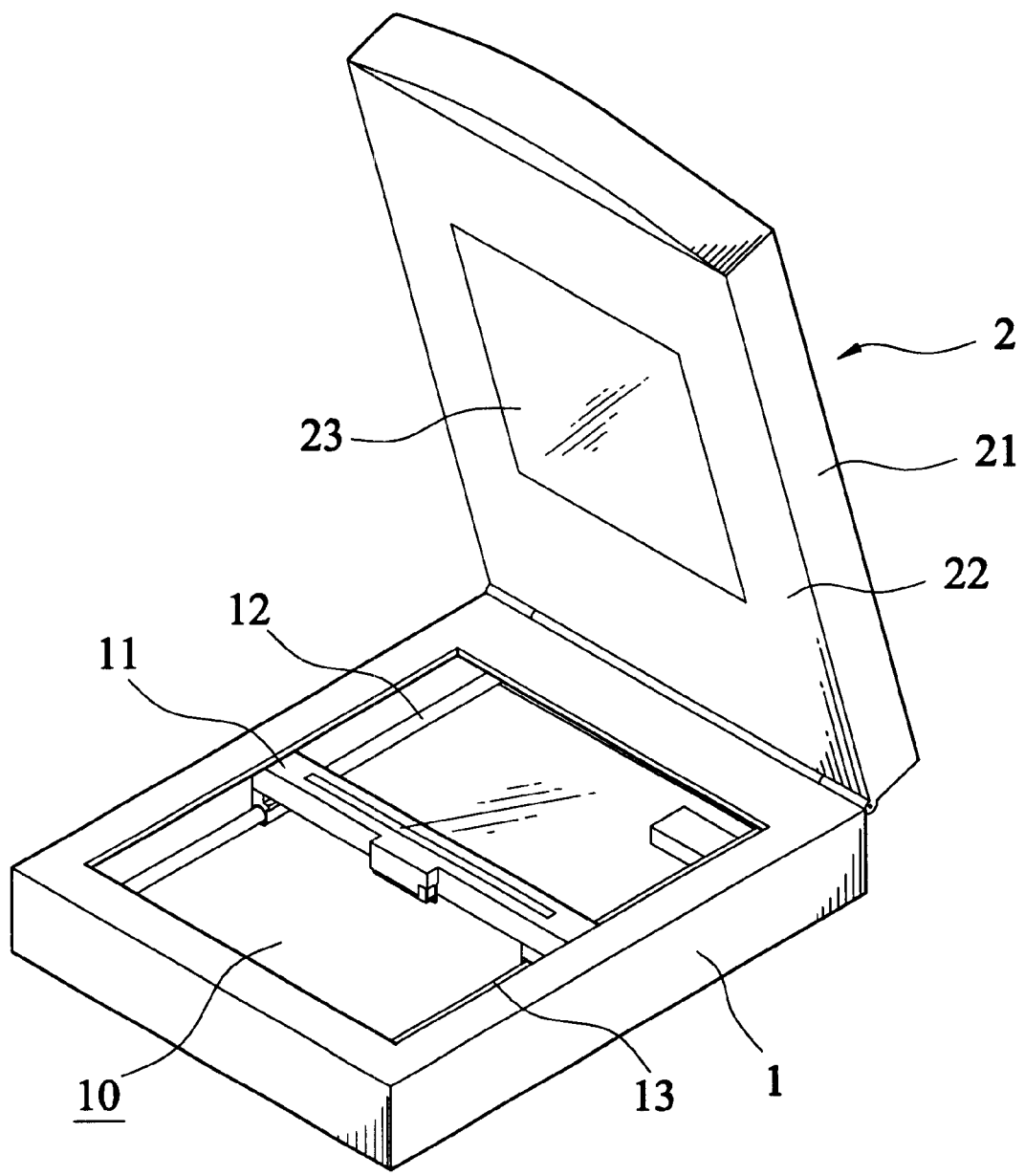
FIG. 1 is a perspective view of a conventional back-light module pivotally mounted on a scanner.
Figure 2:
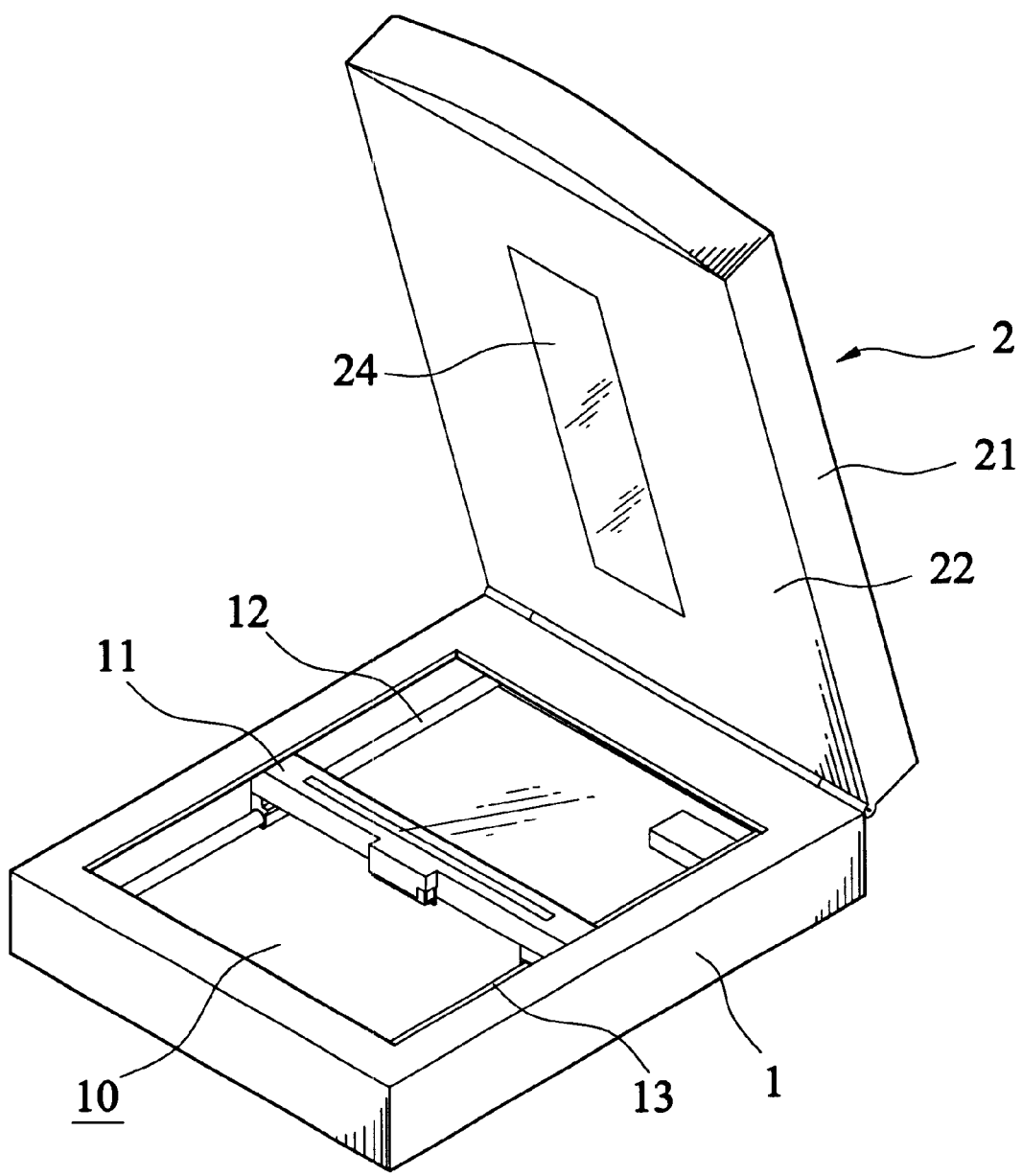
FIG. 2 is a perspective view of another conventional back-light module pivotally mounted on a scanner.
Figure 3:
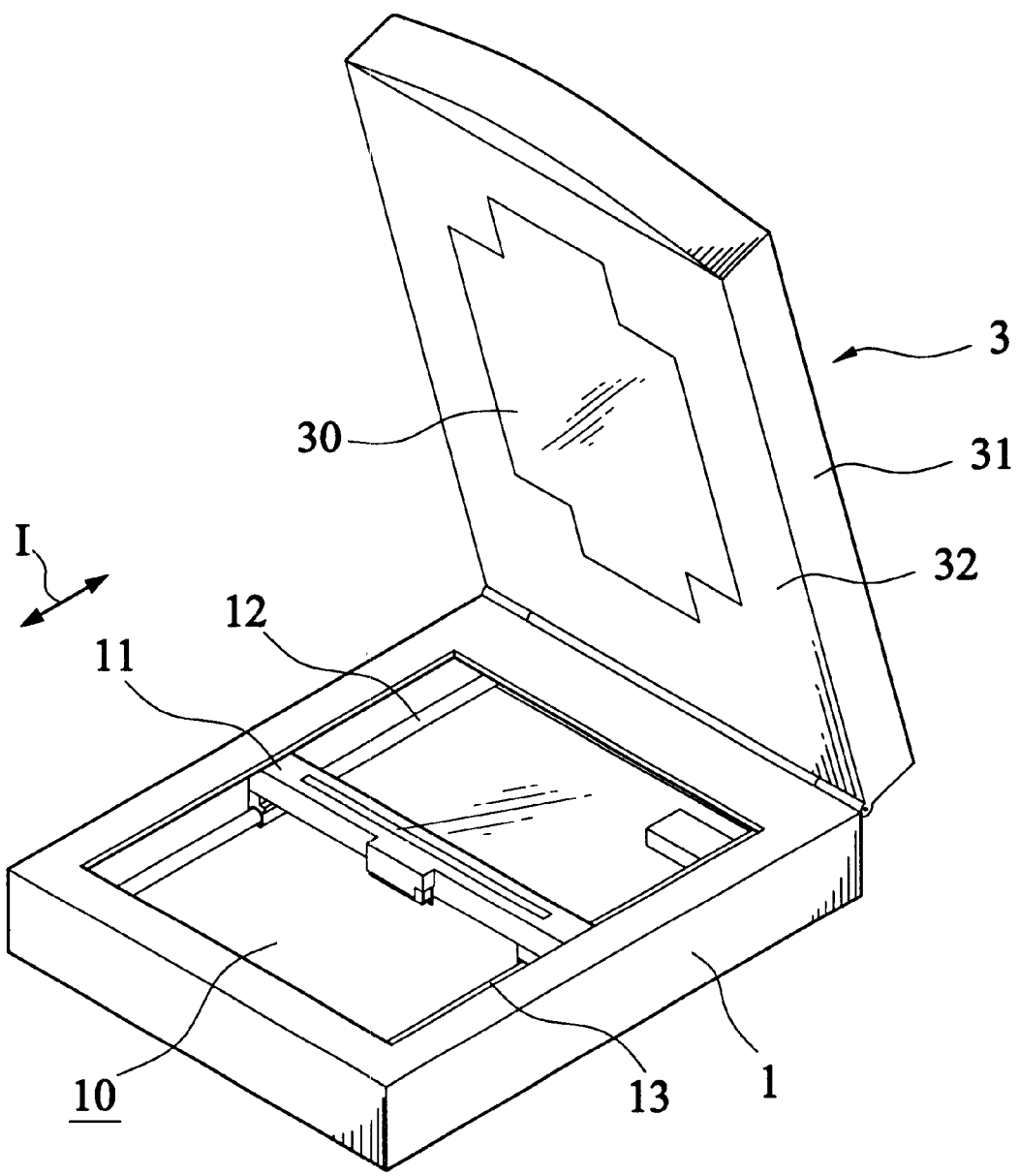
FIG. 3 is a perspective view showing a back-light module constructed in accordance with a first embodiment of the present invention is pivotally mounted on a scanner.

With reference to the drawings and in particular to FIG. 3, a back-light module constructed in accordance with a first embodiment of the present invention is shown. It is to be noted that, for simplicity, similar elements through the drawings will be designated with same or like reference numerals.

As shown in FIG. 3, the back-light module 3 of the present invention is pivotally attached to the document supporting plate 10 of a flat-bed type image scanning device 1. The image scanning device 1 includes an optical scanning module 11 and a pair of guide rails 12, 13. The optical scanning module 11 is movably supported inside the housing of the image scanning device 1 by the guide rails 12, 13 for moving in a longitudinal direction I to scan the original document supported on the document supporting plate 10.

Figure 4:
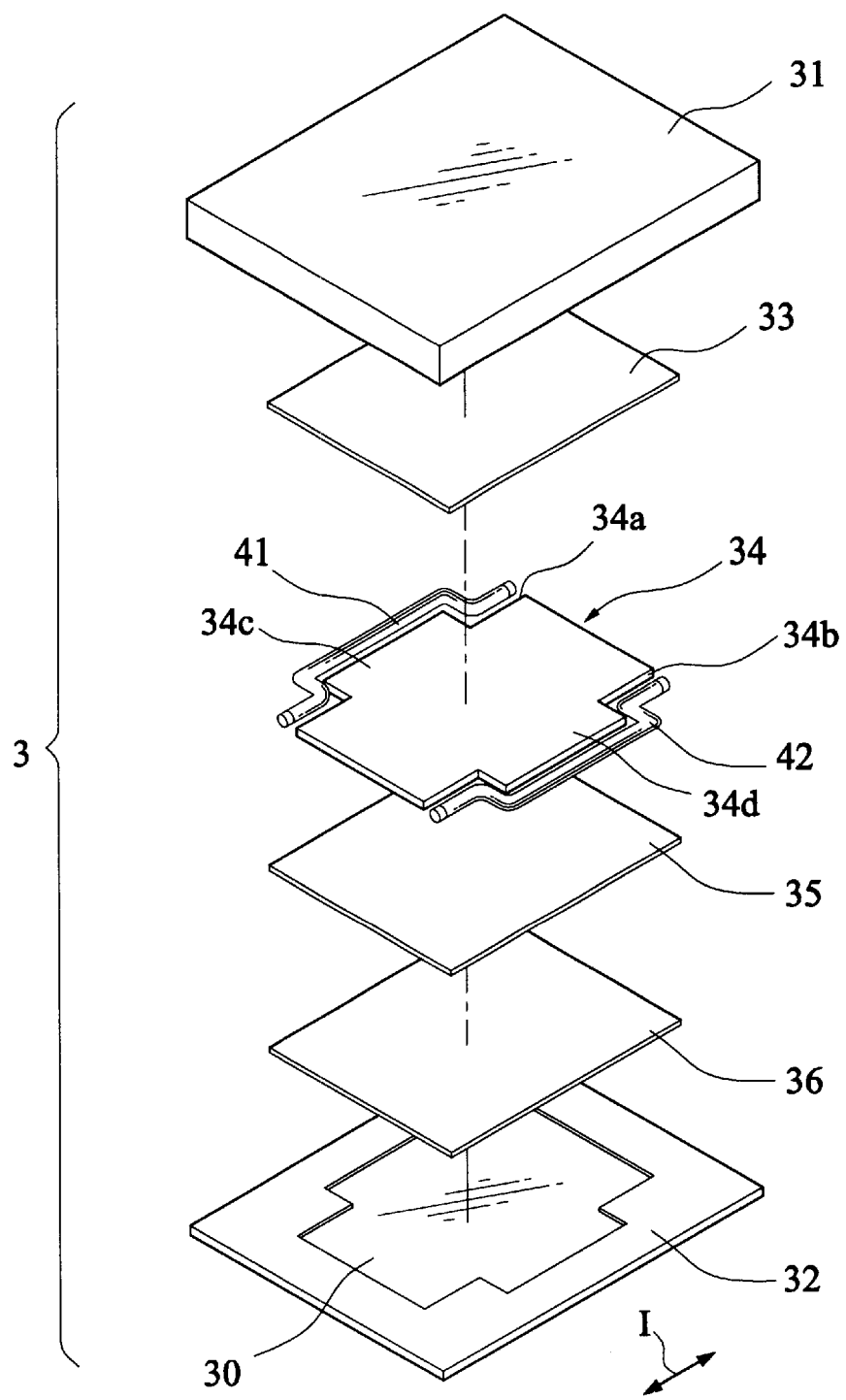
FIG. 4 is an exploded view of the back-light module in accordance with the first embodiment of the present invention.
Figure 5:
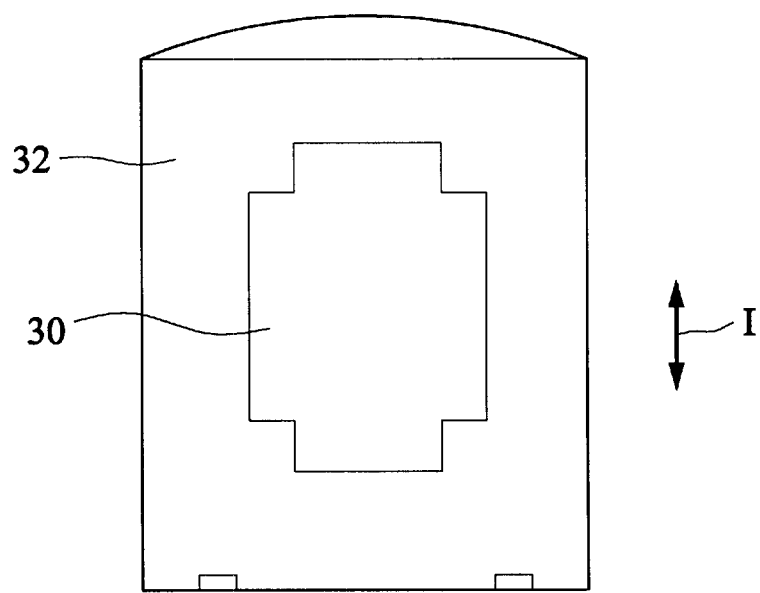
FIG. 5 is a schematic bottom plan view showing the light projecting window is mounted in the central opening of the bottom plate of the backlight module of FIG. 3.

FIG. 4 is an exploded view of the back-light module of the first embodiment of the present invention. The back-light module 3 comprises a casing 31 and a bottom plate 32 mounted on the bottom of casing 31. A light projecting window 30 with symmetrical opposite edges is mounted on a central opening of the bottom plate 32. FIG. 5 shows a bottom plan view showing the light projecting window 30 is mounted in the central opening of the bottom plate 32. The back-light module 3 further comprises a reflective sheet 33, a light guide plate 34, a diffusion plate 35, and a focusing plate 36, sequentially arranged in the casing 31 of the back-light module 3.

Figure 6:
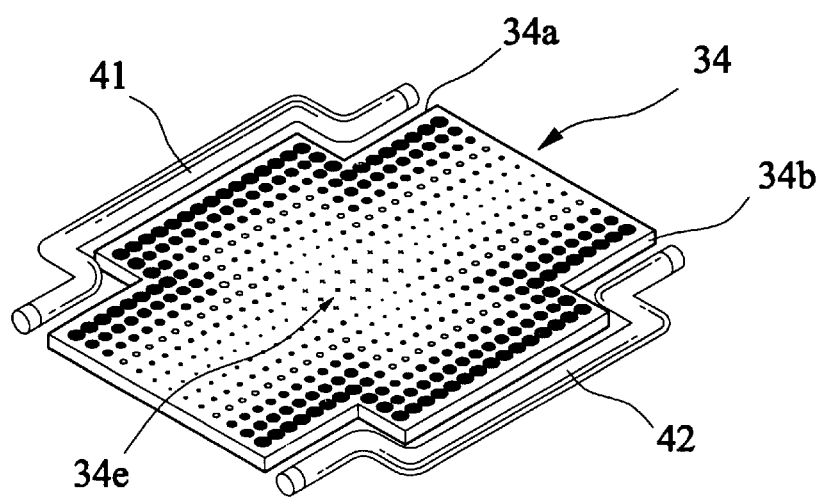
FIG. 6 is a perspective view showing two tubular lamps are respectively arranged on opposite edges of the light guide plate of the present invention.

The light guide plate 34 has a shape with two symmetrical opposite edges 34a, 34b corresponding to the shape of the light projecting window 30. In this embodiment, two middle outward wing portions 34c, 34d are further protruded from the middle sections of the opposite edges 34a, 34b respectively. Along the two opposite edges of the light guide plate 34, two bent tubular lamps 41, 42 are arranged in a direction parallel to the moving direction I of the optical scanning module 11. With reference to FIG. 6, the tubular lamps 41, 42 has a bent shape corresponding to the outlines of opposite edges of the light guide plate 34. The light generated by the tubular lamps 41, 42 is guided and spreading over uniformly on the light guild plate 34.

Light projected from the light guide plate 34 is further distributed by the diffusion plate 35 to obtain a uniform light. The focusing plate 36 is arranged under the diffusion plate 35 for focusing the distributed light projected from the diffusion plate 35. Finally, the focused light from the diffusion plate 35 is projected to the optical scanning module 11 via the light projecting window 30 of the bottom plate 32.

Referring to FIG. 6, illumination to different points on the light guide plate 34 from the tubular lamp 41, 42 depends on the distance from the tubular lamp 34. The closer the point on the light guide plate distances from the tubular lamp, the stronger illumination it will receive. On the contrary, the further the point on the light guide plate distances from the tubular lamp, the weaker illumination it will receive. The central region 34e of the light guide plate 34 is the farthest area from either tubular lamp 41 or 42, which receives the weakest illumination from the lamps. However, since each point on the light guide plate is simultaneously illuminated by both tubular lamps 41, 42, the total illumination of the central region 34e will be substantially the same as that of the other region on the light guide plate. As a whole, each point on the light guide plate shows the similar brightness.

Figure 7:
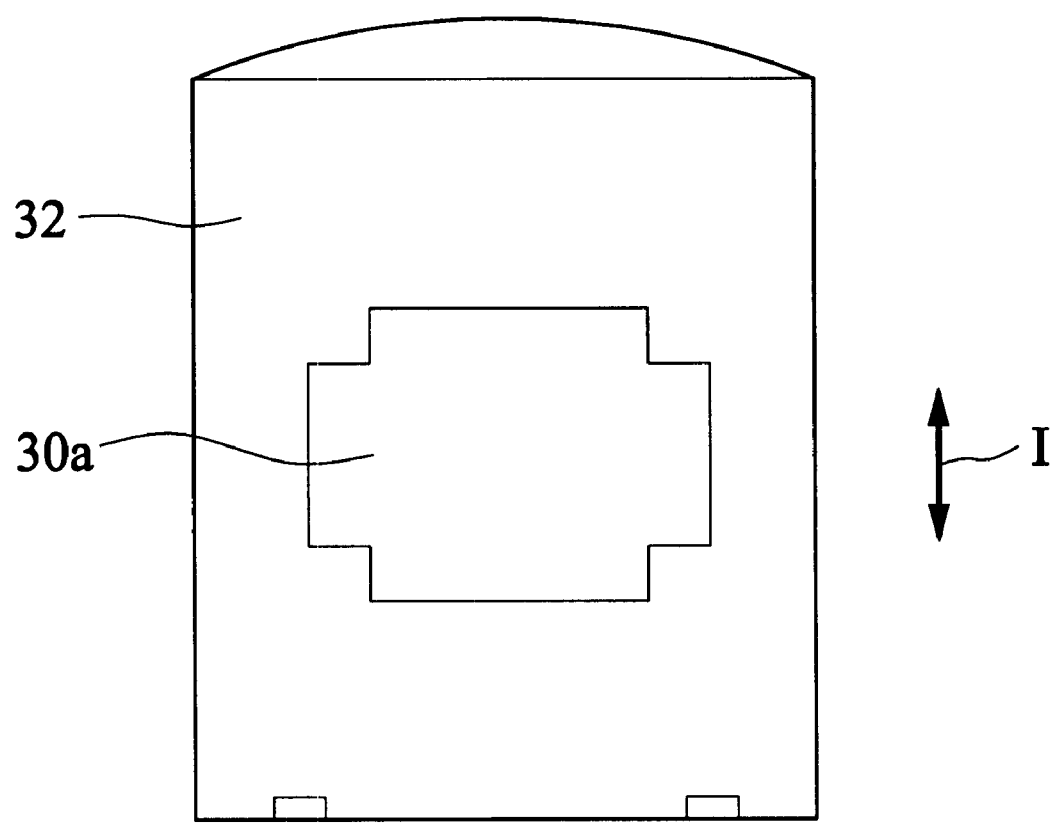
FIG. 7 is a schematic bottom plan view showing the light projecting window may be arranged in a vertical direction with respect to the moving direction of the optical scanning module of the scanner.
Figure 8:
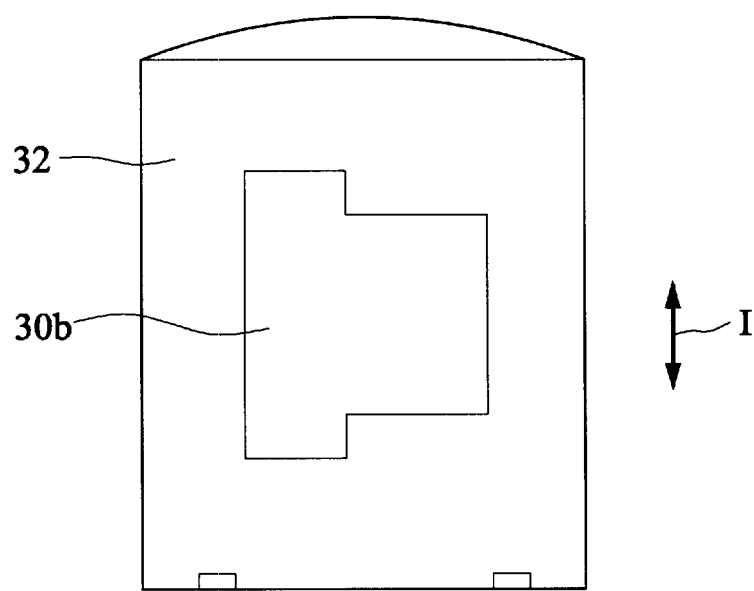
FIG. 8 is a schematic bottom plan view showing the light projecting window is in a form of asymmetric patterns in accordance with a second embodiment of the present invention.
Figure 9:
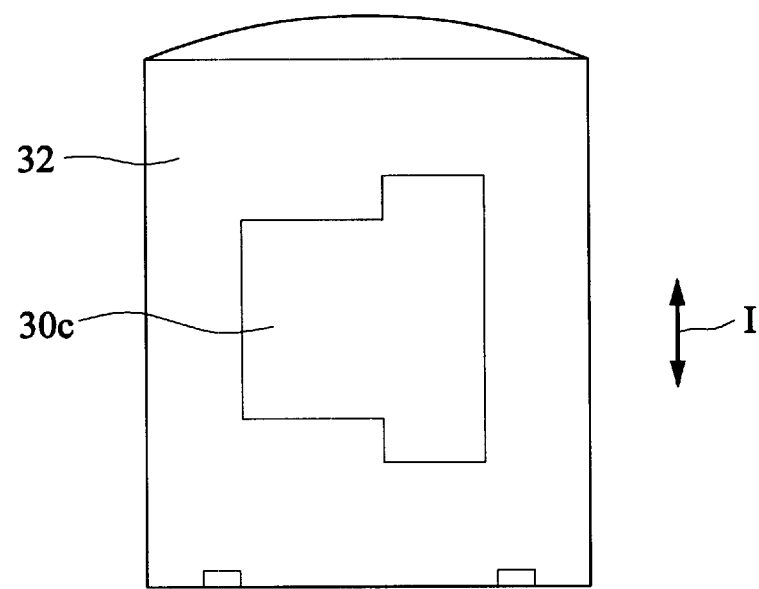
FIG. 9 is a schematic bottom plan view showing the light projecting window is in a form of asymmetric patterns in accordance with a third embodiment of the present invention.
Figure 10:
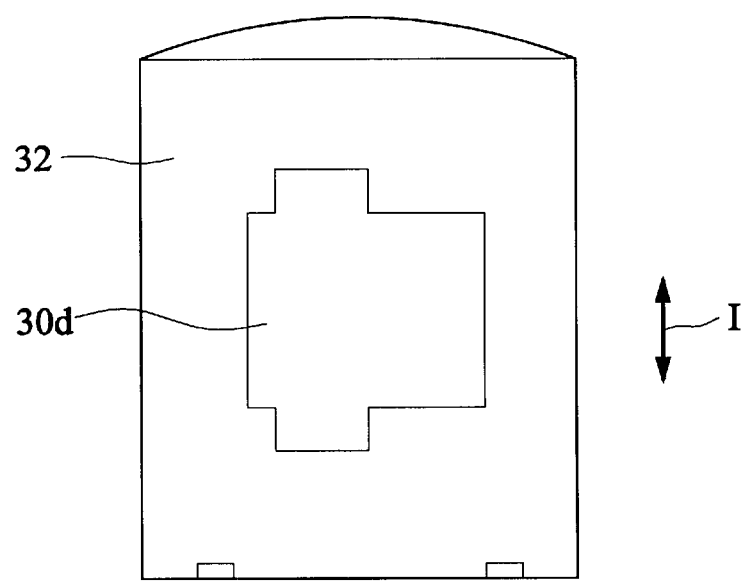
FIG. 10 is a schematic bottom plan view showing the light projecting window is in a form of asymmetric patterns in accordance with a forth embodiment of the present invention.
Figure 11:
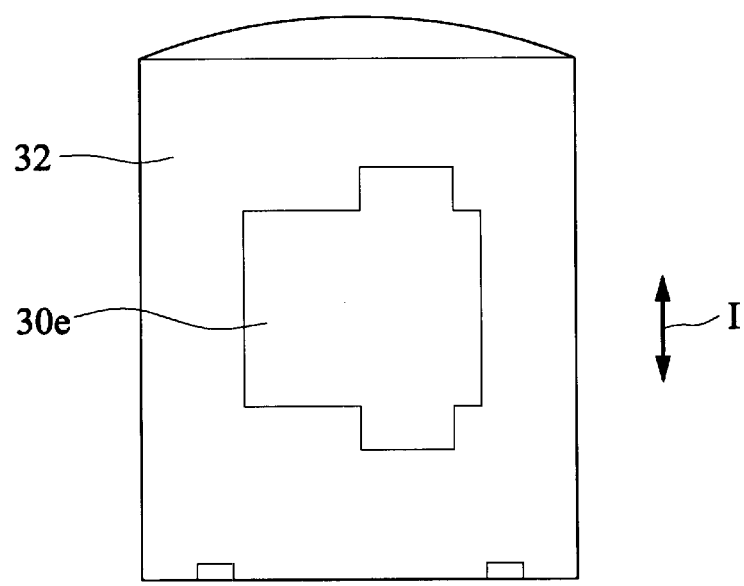
FIG. 11 is a schematic bottom plan view showing the light projecting window is in a form of asymmetric patterns in accordance with a fifth embodiment of the present invention.

In the above embodiment, both the light guide plate and the light projecting window have identical shape of symmetric opposite edges. Practically, the light projecting window can be rotated and arranged in a vertical direction with respect to the moving direction I of the optical scanning module 11, as shown in FIG. 7 for providing light source. In this case, the light guide plate 34 and the tubular lamps 41, 42 are also arranged to match the direction of the light projecting window 30a.

In additional to the above embodiments, the light projecting window can be designed in the forms of asymmetric patterns 30b, 30c, 30d, 30e with asymmetric opposite edges, as shown in FIGS. 8 to 11. For those asymmetric geometrical patterns, the brightness at the central region is usually non-uniform. However, one or more diffusion plate, such as the diffusion plate 35 as shown in FIG. 4, can be added to effectively improve the light distribution.

Although the present invention has been described with reference to the preferred embodiment and the best mode of operation thereof, it is apparent to those skilled in the art that a variety of modifications and changes may be made without departing from the scope of the present invention which is intended to be defined by the appended claims.

What is claimed is:

1. A back-light module for projecting a light source to an image scanning device provided with an optical scanning module, comprising:

a casing;

a bottom plate mounted on the casing, the bottom plate having a central opening with symmetric opposite sides;

a light projecting window having two symmetric opposite edges corresponding to the opposite sides of the central opening of the bottom plate;

a light guide plate mounted in the casing and having two symmetric opposite edges corresponding to that of the light projecting window, the light guide plate having two outward wing portions respectively formed on a middle section of the opposite edges of the light guide plate; and a pair of tubular lamps respectively arranged adjacent the two opposite edges of the light guide plate, each of the tubular lamps having a shape corresponding to the symmetric opposite edges of the light guide plate;

wherein the light source generated by the tubular lamps is guided by the light guide plate and then projected to the optical scanning module of the scanner via the light projecting window.

2. The back-light module as claimed in claim 1, wherein each of the tubular lamps is extended in a direction parallel to a moving direction of the optical scanning module of the image scanning device.

3. The back-light module as claimed in claim 1, wherein each of the tubular lamps is extended in a direction transverse to a moving direction of the optical scanning module of the image scanning device.

4. A back-light module for projecting a light source to an image scanning device provided with an optical scanning module, comprising:

a casing;

a bottom plate mounted on the casing, the bottom plate having a central opening with asymmetric opposite sides;

a light projecting window having two asymmetric opposite edges corresponding to the opposite sides of the central opening of the bottom plate;

a light guide plate mounted in the casing and having two outward wing portions respectively asymmetrically formed on two opposite edges of the light guide plate corresponding to that of the light projecting window; and a pair of tubular lamps respectively arranged adjacent the two opposite edges of the light guide plate, each of the tubular lamps having a shape corresponding to the asymmetric opposite edges of the light guide plate;

wherein the light source generated by the tubular lamps is guided by the light guide plate and then projected to the optical scanning module of the scanner via the light projecting window.

5. The back-light module as claimed in claim 4, wherein each of the tubular lamps is extended in a direction parallel to a moving direction of the optical scanning module of the image scanning device.

6. The back-light module as claimed in claim 4, wherein each of the tubular lamps is extended in a direction transverse to a moving direction of the optical scanning module of the image scanning device.

* * * * *